U. G. MILLER.
COMBINED DOOR BUMPER AND HOLDER.
APPLICATION FILED OCT. 28, 1914.
1,128,173.
Patented Feb. 9, 1915.
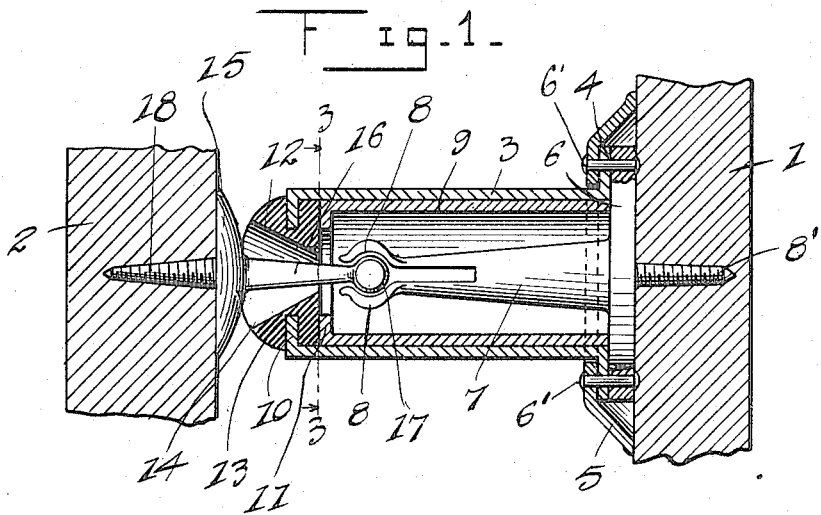
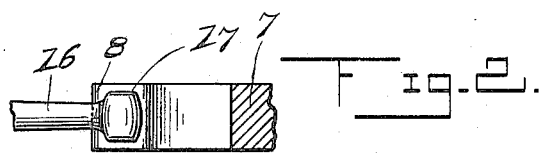
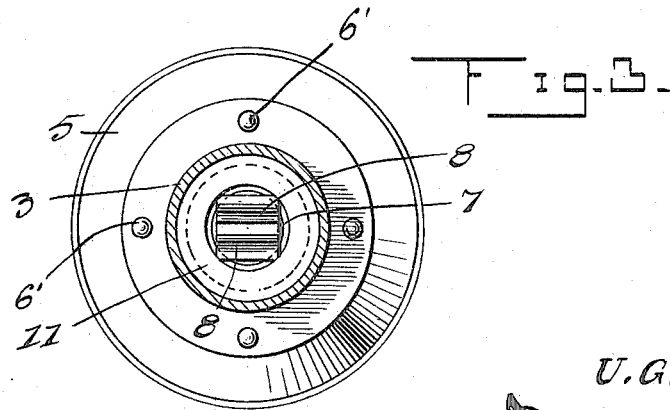
Inventor
U. G. Miller

UNITED STATES PATENT OFFICE.

ULYSSES G. MILLER, OF LEBO, KANSAS.

COMBINED DOOR BUMPER AND HOLDER.

1,128,173.  Specification of Letters Patent.  Patented Feb. 9, 1915.

Application filed October 28, 1914. Serial No. 869,069.

*To all whom it may concern:*

Be it known that I, ULYSSES G. MILLER, a citizen of the United States, residing at Lebo, in the county of Coffey and State of Kansas, have invented certain new and useful Improvements in Combined Door Bumpers and Holders; and I do hereby declare the following to be a full, clear, and exact description of the invention, such as will enable others skilled in the art to which it appertains to make and use the same.

This invention relates to combined door bumpers and holders, and one of the principal objects of the invention is to provide a device of simple construction which can be manufactured at low cost and which will operate efficiently to prevent a door from slamming open and will also hold the door open when connected to the holder.

Another object of the invention is to provide a simple device to be connected to the base board for serving as a cushion against which said door may be opened, and to serve as a holder to hold the door open.

The foregoing and other objects may be attained by means of the construction illustrated in the accompanying drawing, in which, Figure 1 is a sectional view through the combined bumper and holder connected to a base board, and showing the stud connected to the door for attachment to the holder, Fig. 2 is a detail sectional view showing the head of the door holder engaged with the spring clasp in the tubular portion of the bumper. Fig. 3 is a sectional view on the line 3—3 of Fig. 1.

Referring to the drawing, the numeral 1 designates the fraction of a base board and 2 is a portion of a door. Connected to the base board 1 is a metal tube 3 having an outwardly extending annular flange 4 connected to the base board 1 by means of a collar 5, and suitable rivets 6 which extend through the collar 5 and through a solid base 6 formed upon or secured to a centrally disposed holding element 7 provided with a screw 8' which is adapted to be inserted in the base board and turned into place to hold a device firmly connected to said base board. The element 7 is provided with spring jaws 8 which are curved as shown in Fig. 1. An inner tube 9 is connected to the tube 3, and the protector tubes are provided with inwardly turned flanges at their upper ends, said flanges being designated by the numerals 10 on the outer tube and 11 on the inner tube. A rubber bumper 12 is connected to the tubes 3 and 9 by means of a groove 13 in the bumper in which is fitted the flange 10 on the outer tube, while the flange 11 on the inner tube supports the bumper in place. The bumper 12 is provided with a flaring central aperture 14.

The stud member 15 is provided with a long shank 16 having a barrel-shaped head 17 thereon. The stud member is provided with a suitable base and a screw 18 leading from the base to be connected to the door in alinement with the bumper and holder connected to the base board.

The operation of the device may be briefly described as follows: When the door is thrown open, the head 17 of the stud member passes into the opening 14 and between the jaws 8 of the holder while the bumper 12 comes into contact with the base portion of the stud thus making the opening of the door noiseless and preventing slamming.

The device is simple in construction, may be manufactured at low cost, and is strong, durable and efficient for its purpose.

Various changes may be made in the details of construction without departing from the spirit and scope of the invention as defined in the claim.

What is claimed is:—

A combined door bumper and holder comprising a tubular casing, consisting of an inner tube and an outer tube, a collar for holding said tubes connected to a base member, a holding element connected to said base member, a screw connected to said base member for attaching the device in position on the base board, a rubber bumper connected to said casing, and provided with a central aperture, said holder being provided with curved resilient jaws, and a stud having a screw for attachment to a door in line with said bumper, said stud having a cylindrical head to engage the resilient members of the holder.

In testimony whereof I affix my signature in presence of two witnesses.

ULYSSES G. MILLER.

Witnesses:
E. L. TRAYLOR,
WAYNE M. TRAYLOR.

Copies of this patent may be obtained for five cents each, by addressing the "Commissioner of Patents, Washington, D. C."